United States Patent

[11] 3,603,432

| [72] | Inventor | Wallace I. Stenzel<br>Thiensville, Wis. |
|---|---|---|
| [21] | Appl. No. | 783,081 |
| [22] | Filed | Dec. 11, 1968 |
| [45] | Patented | Sept. 7, 1971 |
| [73] | Assignee | Waukee Engineering Co.<br>Milwaukee, Wis. |

[54] APPARATUS FOR PERIODICALLY DISPENSING A LIQUID
4 Claims, 3 Drawing Figs.

[52] U.S. Cl. ..................................... 184/6 D,
184/96, 236/46
[51] Int. Cl. ........................................ F16n 29/02
[50] Field of Search .......................... 236/46 E,
68; 337/107; 141/160; 184/96, 7, 7 D, 7 CR, 6, 6 D

[56] References Cited
UNITED STATES PATENTS

| 2,112,860 | 4/1938 | Moore | 184/7 |
|---|---|---|---|
| 2,728,415 | 12/1955 | Leclair | 184/96 X |
| 2,879,864 | 3/1959 | Kupka | 184/7 |
| 3,057,433 | 10/1962 | Rusche | 184/1 (UX) |
| 3,078,960 | 2/1963 | Minton | 184/7 X |
| 1,553,405 | 9/1925 | Smith | 337/107 X |
| 1,631,679 | 6/1927 | Hall | 337/107 X |
| 3,053,343 | 9/1962 | Hornbostel | 184/96 |
| 3,211,254 | 10/1965 | Bullard, III | 184/6 |
| 3,427,840 | 2/1969 | Richter | 184/6 X |
| 3,450,227 | 6/1969 | Montgomery | 184/6 |
| 3,463,268 | 8/1969 | Krause | 184/6 X |

*Primary Examiner*—Manuel A. Antonakas
*Attorney*—Andrus, Sceales, Starke & Sawall ABSTRACT: A device for automatically metering precise amounts of a lubricant to an apparatus requiring periodic lubrication. The device comprises a reservoir to contain the lubricant and a conduit connects the pressure side of the apparatus with the reservoir so that a positive pressure is maintained on the lubricant within the reservoir. A discharge line connects the reservoir with the apparatus requiring lubrication and the flow of lubricant through the discharge line is controlled by a solenoid-operated valve. In addition to the solenoid valve, an adjustable needle valve is located between the solenoid-operated valve and the apparatus and functions to adjust the rate of flow of the lubricant when the solenoid valve is opened. The flow through the discharge line can be viewed through a sight glass located downstream of the needle valve.

Operation of the system is automatically controlled by a dual-timer arrangement including a cycle timer which sets the periodic cycle of lubrication and opens the solenoid valve through a time-delay relay. The time-delay relay sets the time of lubrication for each cycle.

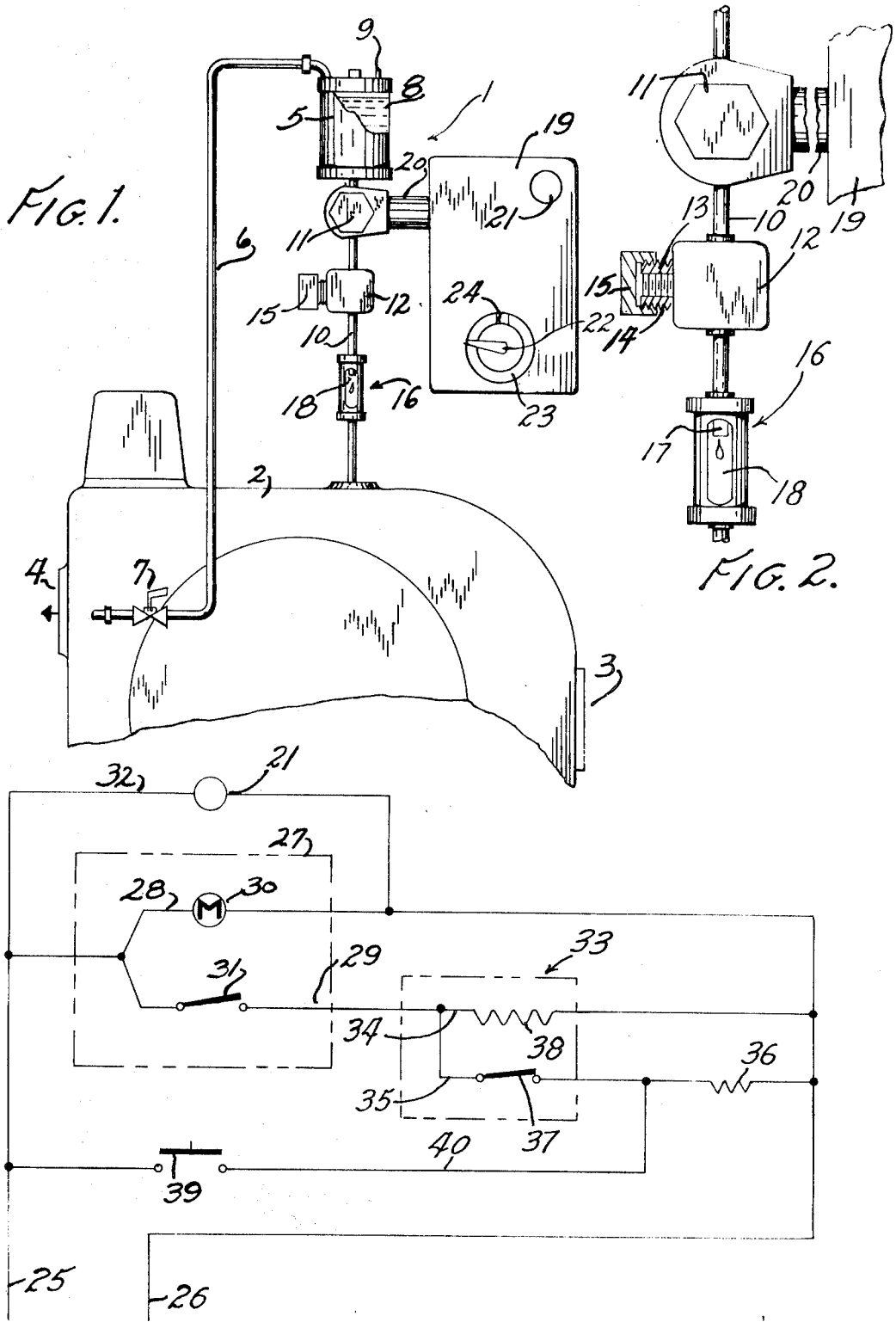

APPARATUS FOR PERIODICALLY DISPENSING A LIQUID

This invention relates to a device for automatically metering precise amounts of a fluid to a desired site or location, and more particularly to a device for metering precise amounts of a lubricant to an apparatus requiring periodic lubrication such as a pump, compressor, motor, or the like.

Some types of equipment such as pumps, motors, generators, compressors and the like require periodic lubrication for effective operation. In many installations periodic lubrication is neglected, with the result that bearings and other moving elements overheat and premature failure of the equipment occurs. With other types of equipment precise and controlled lubrication is required, such as for example, lubricating the vanes of a gas compressor, for over lubrication can result in hydrocarbon contamination of the gases being compressed. In general, there has been no accurately controlled system of periodic lubrication, and lubrication rests primarily on the ability of the operator to periodically lubricate the apparatus with a precise amount of lubricant.

The present invention is directed to a device for automatically lubricating a working apparatus in which the lubricant is periodically measured and dispensed in precise amounts on one drop or more. In general, the device includes a reservoir which contains a lubricant and a pressure line connects the headspace of the reservoir with the pressure side of the compressor, or with an external pressure source, so that a positive pressure is continuously applied to the lubricant.

A discharge line connects the reservoir with the compressor and the flow of the lubricant within the discharge line is controlled by a solenoid-operated valve. In addition to the solenoid valve, an adjustable needle valve is located in the discharge line downstream of the solenoid valve and by adjustment of the needle valve the flow of the lubricant can be adjusted when the solenoid valve is open. To permit the operator to view the flow of lubricant through the discharge line, a sight glass is located downstream of the needle valve.

Operation of the lubrication system is automatically controlled by a dual timer arrangement, including a cycle timer which sets the cycle of lubrication and actuates the solenoid valve through a time-delay relay. The time-delay relay sets the time or period of lubrication for each lubrication cycle.

The lubrication system of the invention accurately measures and dispenses lubricant in precise amounts which can be as small as one drop or more for each lubrication cycle. The lubricant is automatically dispensed at preset time intervals as dictated by the need of the equipment.

By connecting the reservoir to the pressure side of the equipment to be lubricated, or to an external pressure source, a positive pressure is continuously applied to the lubricant to insure accurate and precise flow to the equipment.

By proper adjustment of the needle valve in the discharge line, the rate of the flow of the lubricant to the equipment can be readily adjusted. The sight glass enables the operator to visually check the rate of flow and to vary the flow by adjustment of the needle valve as necessary.

As the lubrication system is a closed and sealed unit, contamination of the lubricant is prevented and this, in turn, prevents contamination of the surfaces to be lubricated.

Other objects and advantages will appear in the course of the following description.

The drawings illustrate the best mode presently contemplated of carrying out the invention.

In the drawings:

FIG. 1 is a diagrammatic view of the lubrication system of the invention as applied to a gas compressor;

FIG. 2 is an enlarged view showing the needle valve and sight glass; and

FIG. 3 is a wiring diagram.

FIG. 1 illustrates a lubrication assembly 1 as associated with a conventional gas compressor 2. The gas is introduced to the compressor 2 through an inlet 3 and the compressed gas is discharged through an outlet 4. The lubrication assembly 1 includes a reservoir or container 5 and the headspace of the reservoir 5 is connected to the pressure side of the compressor by conduit 6. A manually operable valve 7 is located within the conduit 6 and operation of the valve 7 will open and close the conduit 6 as desired.

The reservoir 5 contains a conventional lubricant 8 which is introduced into the reservoir through an opening in the top of the reservoir enclosed and sealed by a filler cap 9. The lubricant 8 is discharged through a discharge line 10 to the compressor 2 and the line 10 is opened and closed by a conventional solenoid-operated valve 11. In addition, to valve 11, an adjustable needle valve 12 is located downstream of valve 11 and by adjustment of valve 12 the flow rate of the lubricant through the line 10 can be varied as desired.

As shown in FIG. 2, a setscrew 13 is connected to the needle valve and is threaded within a boss 14 attached to the valve body. The outer periphery of the boss 14 is threaded and a cap 15 is engaged with the external thread to prevent tempering with the setting of the setscrew 13. By adjustment of the setscrew 13, the position of the needle valve 12 can be changed as desired to regulate the flow of the lubricant through the line 10.

To enable the operator to visually inspect or check the rate of flow of the lubricant, a sight glass assembly 16 is located downstream of the valve 12 in the discharge line 10. As best shown in FIG. 2 the portion of the line 10 located within the sight glass assembly 16 is interrupted, as indicated by 17, and a window 18 is positioned in the assembly so that the dropwise flow of the lubricant from the interrupted end 17 of the line can be visually checked. While viewing the flow rate through window 18, the operator can vary the flow, if necessary, by adjustment of the setscrew 13. Alternately, a flowmeter, which measures the flow rate, can be substituted for the sight glass assembly 16.

The lubrication system is automatically controlled by a dual-timer arrangement which is contained within a casing 19 mounted by a bracket from the compressor. Solenoid valve 11 is connnected to the casing by a nipple 20 and the wiring for the valve extends within the nipple. As shown in FIG. 1, the casing includes an operating light 21 which is adapted to be lighted when the lubrication system is operable. In addition, a pointer 22 is mounted on the face of the casing 19 and rotates around a dial 23 which represents the overall timing cycle while the small segment 24 of the dial 23 indicates the lubrication period within the overall timing cycle. When the pointer 22 moves within the segment 24, the lubricating cycle will be in effect.

FIG. 3 illustrates the wiring diagram for the lubrication system. The power lines 25 and 26 are connected to a source of suitable electric power and line 25 is connected to the cycle timer indicated generally by 27. More specifically, power line 25 is connected to a parallel lines 28 and 29 and the timer motor 30 is located in line 28, while the switch 31 is connected in line 29. Operation of the motor 30 drives a cam, not shown, in a conventional manner, and the cam operates to close the switch 31 at a given time during rotation of the cam.

The light 21 is connected in line 32 across the cycle timer 27 and is lighted when power is applied to the lines 25 and 26.

Switch 31 of cycle timer 27 is connected to time-delay relay 33. The time-delay relay 33 includes parallel circuits 34 and 35 and when the switch 31 is closed, power is supplied through line 35 to energize the solenoid 36 through closed switch 37. Energizing solenoid 36 opens valve 11 in discharge line 10. In addition, power is supplied through bimetallic element 38 in line 34, and when the temperature of the element is raised to a preset level the element 38 will operate to open switch 37 to thereby deenergize the solenoid 36.

A manually operable switch 39 is located in line 40 which is connected between the power line 25 and the line 35. By manually closing the switch 39, timer 27 and time-delay relay 33 are bypassed and the solenoid 36 will be energized to thereby open the valve 11 in the discharge line 10.

To operate the lubrication system of the invention, the valve 7 in pressure line 6 is initially closed and the reservoir is filled with the lubricant. After filling, the filler cap 9 is threaded within the filler opening and the valve 7 is opened.

With the compressor operating, the switch 39 is closed, opening the valve 11 so that the lubricant will flow through the line 10 to the compressor. The rate of flow through the line 10 is then adjusted by the operator by viewing the flow and adjusting the rate as desired by the setscrew 13 of needle valve 12. As previously mentioned, the flow rate generally is quite small, being dropwise, rather than a steady stream. After the flow rate has been adjusted to the desired value, the switch 39 is opened and the lubrication will then proceed automatically.

Under the automatic operation, rotation of the timer motor 30 will act to close the switch 31 thereby supplying power to the time-delay relay 33 and energizing the solenoid 36 through the closed switch 37. Energizing solenoid 36 opens valve 11 and the liquid will then flow through the discharge line 10 to the compressor. After a preset time, the bimetallic element 38 will act to open the switch 37 to thereby deenergize the solenoid valve 36 and stop flow through the line 10. This cycle is continuously repeated as long as he cam motor 30 is operated.

The lubrication system of the invention automatically dispenses lubricant at preset timed intervals as dictated by the needs of the equipment and the lubrication system will operate unattended and continuously.

As the pressure from the working equipment, such as the compressor, is applied to the lubricant, a more accurate dispensing of the lubricant in precise amounts of one drop or more is attained.

The rate of flow of the lubricant to the compressor or other equipment, can be readily checked by the operator by viewing the flow through the sight glass and the flow rate can be varied if necessary, by adjustment of the needle valve.

While the above description has been directed to the lubricating system as employed with the compressor, it is contemplated that the system can be used to automatically and periodically dispense small amounts of a liquid to any desired site or location.

Various modes of carrying out the invention are contemplated as being within the scope of the following claims particularly pointing out and distinctly claiming the subject matter which is regarded as the invention.

I claim:

1. A lubrication system for supplying a lubricant to a working apparatus at periodic intervals, comprises comprising a reservoir to contain a lubricant, a discharge line connecting the reservoir to the working apparatus, first valve means in said discharge line, valve actuating means for periodically opening said first valve means for a preset period of time, adjustable second valve means located in the discharge line between said first valve means and said working apparatus, adjustment of said second valve means acting to regulate the flow of the lubricant through the discharge line when said first valve means is open, said valve actuating means including cycle timing means operably connected to the first valve means for opening said first valve means at preset time intervals, and said valve actuating means also including time-delay relay means for closing said first valve means after a preset time period less than said time interval, said cycle timing means and said first valve means being connected in an electrical circuit, said time-delay means including switch means connected in said circuit and said time-delay relay means including a timing element operably connected to said switch means for actuating said switch means to open the circuit after termination of said preset time period.

2. The system of claim 1, wherein said apparatus has a pressure side and said system includes a pressure line connecting the pressure side of said apparatus to the headspace of said reservoir whereby the pressure acts on said lubricant.

3. The system of claim 1, and including flow indicating means located in the discharge line between the second valve means and said working apparatus, said flow indicating means serving to visually indicate the flow rate of the liquid within the discharge line.

4. The system as defined in claim 3, wherein said flow indicating means includes a casing connected in said discharge line and said discharge line is interrupted within said casing to provide an interrupted end, and said casing includes a window disposed in general alignment with said interrupted end whereby the flow of liquid from said interrupted end can be viewed.